United States Patent [19]
Cornwell

[11] Patent Number: 6,024,112
[45] Date of Patent: Feb. 15, 2000

[54] AUTOMATIC DRAIN VALVE

[75] Inventor: James P. Cornwell, Albion, Pa.

[73] Assignee: R. Conrader Company, Erie, Pa.

[21] Appl. No.: 09/342,873

[22] Filed: Jun. 29, 1999

Related U.S. Application Data

[60] Provisional application No. 60/091,017, Jun. 29, 1998.
[51] Int. Cl.[7] ....................................... F16T 1/12
[52] U.S. Cl. ..................... 137/204; 137/624.14
[58] Field of Search ................................. 137/204, 624.14

[56] References Cited

U.S. PATENT DOCUMENTS 4,222,403  9/1980  Sonoda ................................. 137/204 X

*Primary Examiner*—Gerald A. Michalsky
*Attorney, Agent, or Firm*—Edward W. Goebel, Jr.; MacDonald, Illlig, Jones & Britton LLP

[57] ABSTRACT

A drain valve removes liquid from a compressed air system whenever cycling pressure of the system reaches either a preselected high drain pressure or a preselected low drain pressure at an inlet port of the valve. An inlet face of a piston of an adjustable pressure valve assembly within a valve body normally seals the inlet port when there is no pressure. The piston is located within a portion of a central cavity of the valve. The piston's inlet face is of a size which allows the force of the adjustable pressure valve assembly to be overcome by a pre-selected high drain pressure at the inlet port. The area of a vent face on the other side of the piston has a size which, when the vent face is sealing the vent passageway, prevents the force exerted by the adjustable pressure valve assembly from overcoming the pressure of the compressed air system until a pre-selected low drain pressure is reached at the inlet port. In either case, the relative sizes of an opening between an inlet cavity and a vent cavity within which the piston is mounted and a vent orifice, and the area of a dividing member mounted across the piston between the inlet cavity and the vent cavity, allow liquid to be drained by the drain valve until such time as all liquid has been removed and compressed air fills the valve.

10 Claims, 6 Drawing Sheets

AUTOMATIC DRAIN VALVE

This application claims the benefit of U.S. Provisional Application No.: 60/091,017 filed Jun. 29, 1998.

BACKGROUND OF THE INVENTION

This invention relates to automatic drain valves for automatically draining condensate liquid from accumulator or receiver tanks, piping, hoses and other components of compressor systems.

Compressed air is widely used for industrial purposes such as removing debris from manufactured parts or equipment and for energizing a wide variety of industrial devices and equipment. When air is compressed by a compressor, water is often produced as a condensate. This water, frequently mixed with oil and other contaminants, accumulates in the lowest point of a compressed air receiver or in the piping, hoses or other components of a compressor system. If this water is not periodically removed from the compressor system, it accumulates to the point where it can dramatically reduce the volume capacity of the receiver. The accumulated water also promotes rust and corrosion of the compressor system's components, as well as the devices and equipment which are energized by compressed air.

To allow the removal of condensate from a compressor system, a drain valve is often installed at a low point of the receiver tank. Compressor systems which have a large network of distribution piping may also have drain valves installed at low points in the piping to allow condensate to be removed.

Over the years many different types of drain valves have been developed and used in compressor systems. Each type of drain valve has its own strengths and weaknesses with respect to the removal of liquid condensate. By way of example, manual drain valves are operated by hand to remove the accumulating liquid condensate until an operator determines all the liquid has been removed. The weakness of these valves is that if their regular operation is neglected, the condensate continues to accumulate, the volume capacity of the receiver is reduced and rust and corrosion are more likely to occur in the compressor system and in devices and equipment operated by compressed air from the system.

Other drain valves operate automatically through the use of a timer. A weakness of this type of drain valve is that cycle times are sometimes set so that they operate too infrequently to keep up with the varying amounts of liquid condensate, thereby allowing it to accumulate. Or the cycle times may be too frequent, resulting in the drain valve staying open after liquid is removed. As a result, large quantities of pressurized air are allowed to escape on each timed cycle of the valve.

Other automatic drain valves open and close with the presence or absence of liquid in the receiver or in other parts of the compressed air system which are being monitored. The advantage of this type of drain valve is that it opens only on the accumulation of a preselected amount of liquid and closes before a significant amount of pressure can escape. The disadvantage of this type of drain valve is that it normally depends on floats and other mechanical mechanisms. These mechanisms may not drain all the accumulated liquid, leaving a fixed amount of condensate permanently in a receiver, for example, to cause rust or corrosion damage. This type of drain valve is also known to be susceptible to failure due to friction caused by the fouling of valve pistons and seats and the failure of floats and other mechanisms. Additionally, this type of drain valve requires careful selection of a combination of floats and orifices to achieve proper operation.

Still other drain valves operate when electrical sensors detect the presence of a preselected amount of accumulated liquid. This type of drain valve tends to be more complex, expensive and difficult to maintain in comparison with mechanical drain valves. Drain valves operating in response to electrical liquid accumulation sensors are also relatively sensitive to the failure of mechanical parts and are known to be inherently susceptible to more frequent failure due to the fouling of liquid sensors with contaminants. Additionally, this type of drain valve generally does not drain all of the liquid which is available to be drained, leaving an amount of condensate permanently within the system.

Compressed air receivers undergo cyclic changes in the pressure of the air within them as air is used and is then replaced by operation of a compressor. Still other drain valves operate based on these known pressure cycles. Such drain valves generally open the drain for a fixed period of time, once or twice during each pressure cycle. Since they open the drain for approximately the same time whether or not liquid is present, they potentially waste large volumes of compressed air when little or no liquid is present in the receiver. Alternatively, when a large amount of liquid is present, these drain valves tend to become overwhelmed and are unable to drain the increasing amount of condensate present within the system, thereby gradually increasing the level of condensate in the receiver and other components of the system.

A drain valve which is the subject of U.S. Pat. No. 4,222,403 Sonora includes a pair of pistons, one having a valve surface which controls liquid flow through an inlet port and the other having a valve surface which controls liquid flow through an outlet port. Both pistons are actuated to open both the inlet port and the outlet port to drain liquid from a compressor at the point where the compressor is unloaded during each of its operating cycles. That is, this valve operates when the desired maximum pressure of the system is reached and the compressor is no longer increasing the pressure in the system. This drain valve is then closed by expanding compressed air at the end of the flow of liquid, avoiding a substantial loss of compressed air. However, this drain valve requires a separate, three-way valve, such as a solenoid valve, to operate it when the maximum pressure of the system is reached, adding an extra component to a compressed air system which is not normally present. It also uses several sliding O-rings on the two pistons. These O-rings are susceptible to damage due to frictional forces. As a result, this drain valve can be expected to require increased maintenance in comparison to valves which do not use sliding O-rings.

SUMMARY OF THE INVENTION

The drain valve of this invention removes liquid from a compressed air system driven by a compressor pump which causes the pressure of the system to cycle between a desired maximum pressure and a desired minimum pressure. The drain valve includes a drain valve assembly which itself includes a drain valve body forming a central cavity and having an inlet port located in it which is adapted to be connected to a compressed air source. The drain valve assembly also has a drain port located in an area away from the inlet port. The drain valve assembly further includes valve operating structures located within the central cavity and a vent passageway which connects a first portion of the central cavity with the drain port. The vent passageway includes a vent orifice for controlling the flow of fluid through it and through the drain port.

A piston assembly is mounted within the first portion of the central cavity between the inlet port and the vent passageway. The piston assembly has an inlet face which can seal the inlet port when the piston is contiguous with the inlet port. The piston assembly also includes a vent face, having an area larger than the area of the inlet face, which can seal the vent passageway when the piston is contiguous with the vent passageway.

The piston assembly further includes a dividing member which divides the first portion of the central cavity into an inlet cavity located between the dividing member and the inlet port and a vent cavity located between the dividing member and the vent passageway. An opening is located between the inlet cavity and the vent cavity. This opening has an area larger than the area of the vent orifice, but smaller than the inlet port and the other areas through which fluid can flow between the inlet port and the vent orifice.

An adjustable pressure valve assembly is mounted within the valve body. It has a valve member which exerts force on the piston assembly and urges it toward the inlet port to cause the inlet face to seal the inlet port when there is no pressure from the compressed air system at the inlet port. The area of the inlet face of the piston assembly is of a size which allows the force exerted by the valve stem to be overcome by a pre-selected high drain pressure at the inlet port as the pressure of the system increases toward its desired maximum pressure. The inlet face is moved away from the inlet port at the high drain pressure. When liquid is present the amount of movement of the inlet face is determined by the area of the dividing member as the flow of liquid through the opening between the inlet cavity and the vent cavity builds up pressure on the inlet side of the dividing member. This movement of the inlet face away from the inlet port allows liquid to drain from the inlet port and through a flow path comprising the inlet cavity, the opening between the inlet cavity and the vent cavity, the vent cavity, the vent passageway including the vent orifice, and the drain port.

The relative sizes of the opening between the inlet cavity and the vent cavity and the vent orifice prevent the vent face on the piston assembly from moving to a closed position against the vent passageway until compressed air begins flowing through the flow path. At that point, liquid has stopped flowing through the flow path and compressed air is not lost because the vent passageway is blocked by the vent face.

The area of the vent face of the piston assembly is of a size such that, when the vent face if sealing said vent passageway, pressure on the piston assembly prevents the force exerted by the valve stem from overcoming the pressure of the compressed air system until a pre-selected low drain pressure is reached at the inlet port as the pressure of the compressor system decreases toward the desired minimum pressure. The vent face is moved away from the vent passageway at the low drain pressure when liquid is present. The amount of movement is determined by the area of the dividing member as the flow of liquid through the opening between the inlet cavity and the vent cavity builds up a pressure on the inlet side of the dividing member. This allows liquid to drain from the inlet port, and through the flow path outlined above, to the drain port.

Here again, the relative sizes of the area of the opening between the inlet cavity and the vent cavity, on the one hand, and the area of the vent orifice, on the other, prevent the inlet face on the piston assembly from moving to a closed position against the inlet port until compressed air begins flowing through the flow path. At that point, the liquid stops flowing and the force of the expanding compressed air first causes the vent face to move toward the vent passage. Thereafter, when the force of expanding compressed air is dissipated and an equilibrium condition sets in, the valve stem causes the inlet face of the piston assembly to close off the inlet port.

This invention does not reside in any one of the features of the automatic drain valve disclosed above which is more fully discussed in the Description of the Preferred Embodiment and claimed below. Rather, this invention is distinguished from the prior art by its combination of structural features which make up a unique automatic drain valve. Important features of this invention are shown and described below to illustrate the best mode contemplated to date of carrying out this invention.

Those skilled in the art will realize that this invention is capable of embodiments which are different from those shown and that the details of the structure of the automatic drain valve can be changed in various manners without departing from the scope of this invention. Accordingly, the drawings and description are to be regarded as illustrative in nature and are not to restrict the scope of the invention. Additionally, the claims are to be regarded as including such equivalent automatic drain valves as do not depart from the nature and scope of this invention.

BRIEF DESCRIPTION OF THE DRAWINGS

For a more complete understanding and appreciation of this invention, and many of its advantages, reference will be made to the following detailed description taken in conjunction with the accompanying drawings.

DESCRIPTION OF PREFERRED EMBODIMENT

Figure 1:
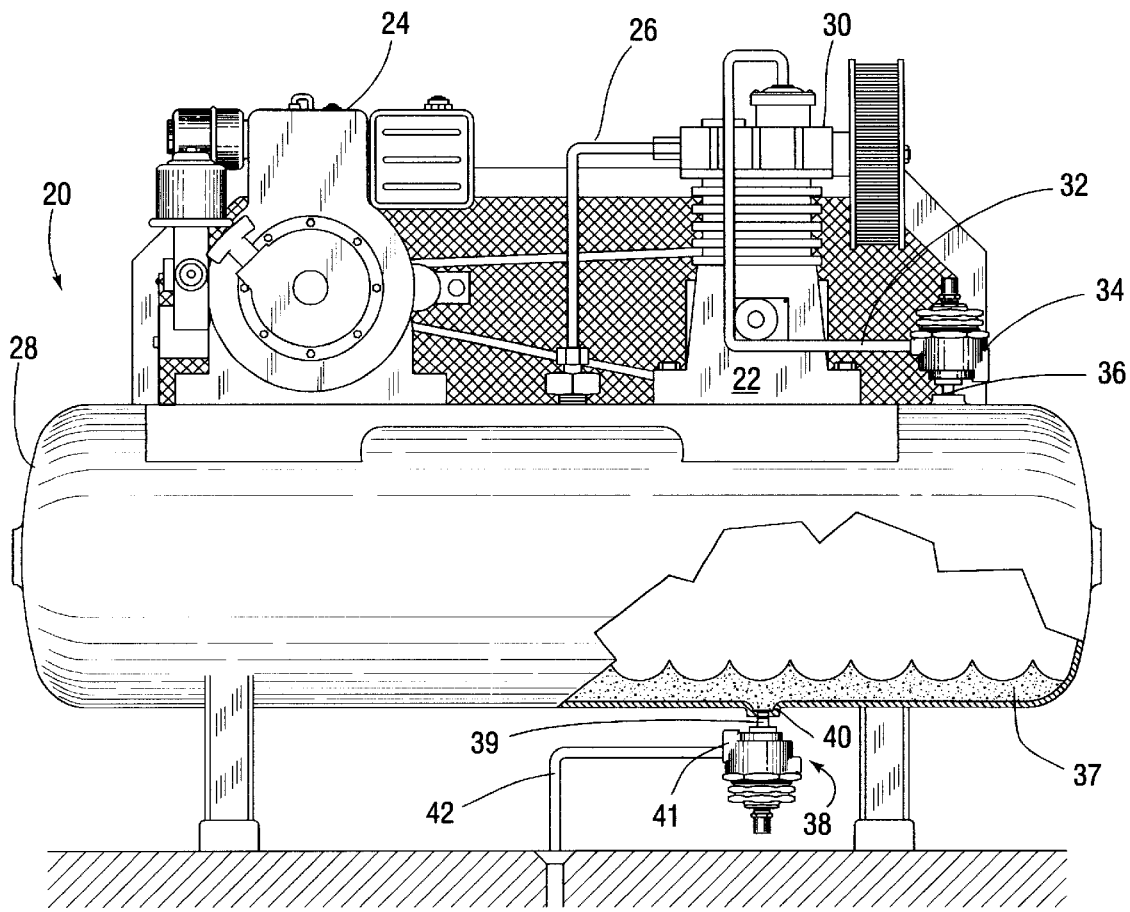
FIG. 1 shows a compressed air system which uses an automatic drain valve made in accordance with this invention.
Figure 2:
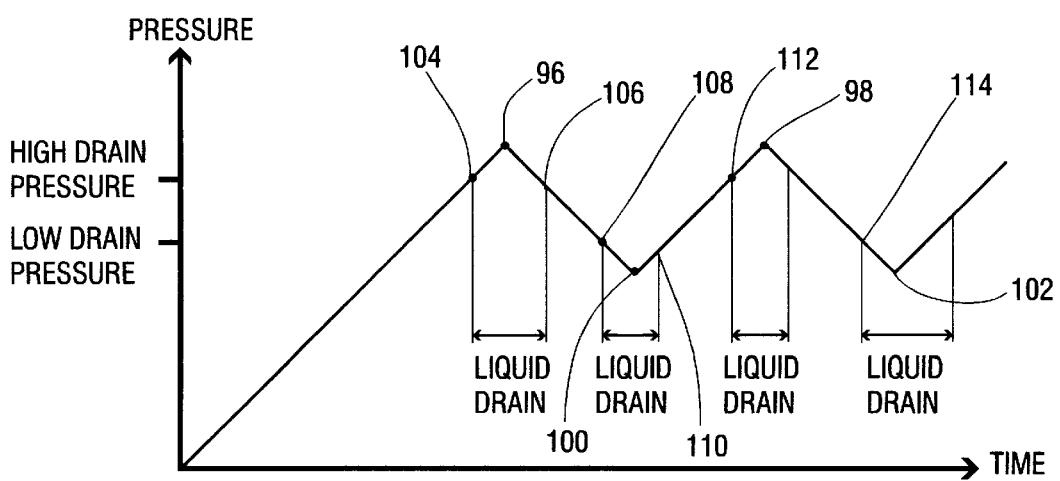
FIG. 2 is a diagram showing the operation of the automatic drain valve of this invention throughout the pressure cycles of a compressed air system.

Referring now to the drawings, identical reference numerals and letters designate the same or corresponding parts throughout the several figures shown in the drawings. As shown in FIG. 1 and FIG. 2, the automatic drain valve of this invention is primarily used on compressed air systems which operate between a desired maximum pressure and a desired minimum pressure. One such system is shown, by way of example, as compressed air system 20 in FIG. 1.

The compressed air system 20 includes a compressor pump 30 which can be driven by an appropriate source of propulsion such as an electric motor or by an internal combustion engine 24 which is shown on FIG. 1. The compressed air which is produced by compressor pump 30 is coupled through a discharge tube or pipe 26 to a tank or receiver 28 which stores the compressed air under pressure. The compressed air system 20 can include a series of valves, pipes and hoses which convey the compressed air from the receiver 28 to various locations where it can be used to power tools, presses, machinery and other devices.

The compressed air system 20 further includes a number of controls which enable it to operate safely and efficiently. It is these controls which cause the air pressure within the receiver 28, and thus within the compressed air system 20, to cycle between the desired maximum pressure and the desired minimum pressure of the system. The compressed air system 20 includes an unloader 22 connected through tubing or pipe 32 to a pilot device 34 which is mounted on a port 36 located on the receiver 28. In some compressed air systems, the functions of the unloader 22 and the pilot device 34 are performed by a single mechanism. In the current embodiment, the pilot device 34 operates in response to the pressure level of the compressed air in the receiver 28. The pilot device 34 causes the unloader 22 to enable the compressor pump 30 to draw air from the atmosphere, compress it and force it into the receiver to raise the pressure within the receiver when the pressure has dropped below the pre-selected minimum pressure of the system 20. The pilot device 34 also causes the unloader 22 to discontinue raising the pressure of the receiver 28 when the pre-selected maximum pressure has been reached.

As air is compressed condensate is produced from it which tends to accumulate at various low points in a compressed air system. By way of example, a cut-away section of the receiver 28 shows that a liquid 37, which is normally water mixed with oil and other contaminants, accumulates at the bottom of that tank. Thus, the automatic drain valve 38 of this invention is connected through its inlet port 39 to a port 40 on the receiver 28. Additionally, a drain port 41 of the drain valve 38 is shown to be connected to a drain tubing or pipe 42 used to dispose of the condensate.

While the drain valve 38 is shown in connection with the compressed air system 20, its use is not limited to a compressed air system of any particular design. The drain valve of this invention will operate in any compressed air system in which the internal pressure alternates between a pre-selected maximum pressure and a pre-selected minimum pressure. A hypothetical pressure cycle for this type of compressed air system 20 is shown in FIG. 2. The operation of the drain valve 38 as the pressure fluctuates will be explained in more detail below with reference to FIG. 2. The drain valve 38 can be used to remove the liquid from any tank, pipe, tubing or component within any such compressed air system.

Figure 3:
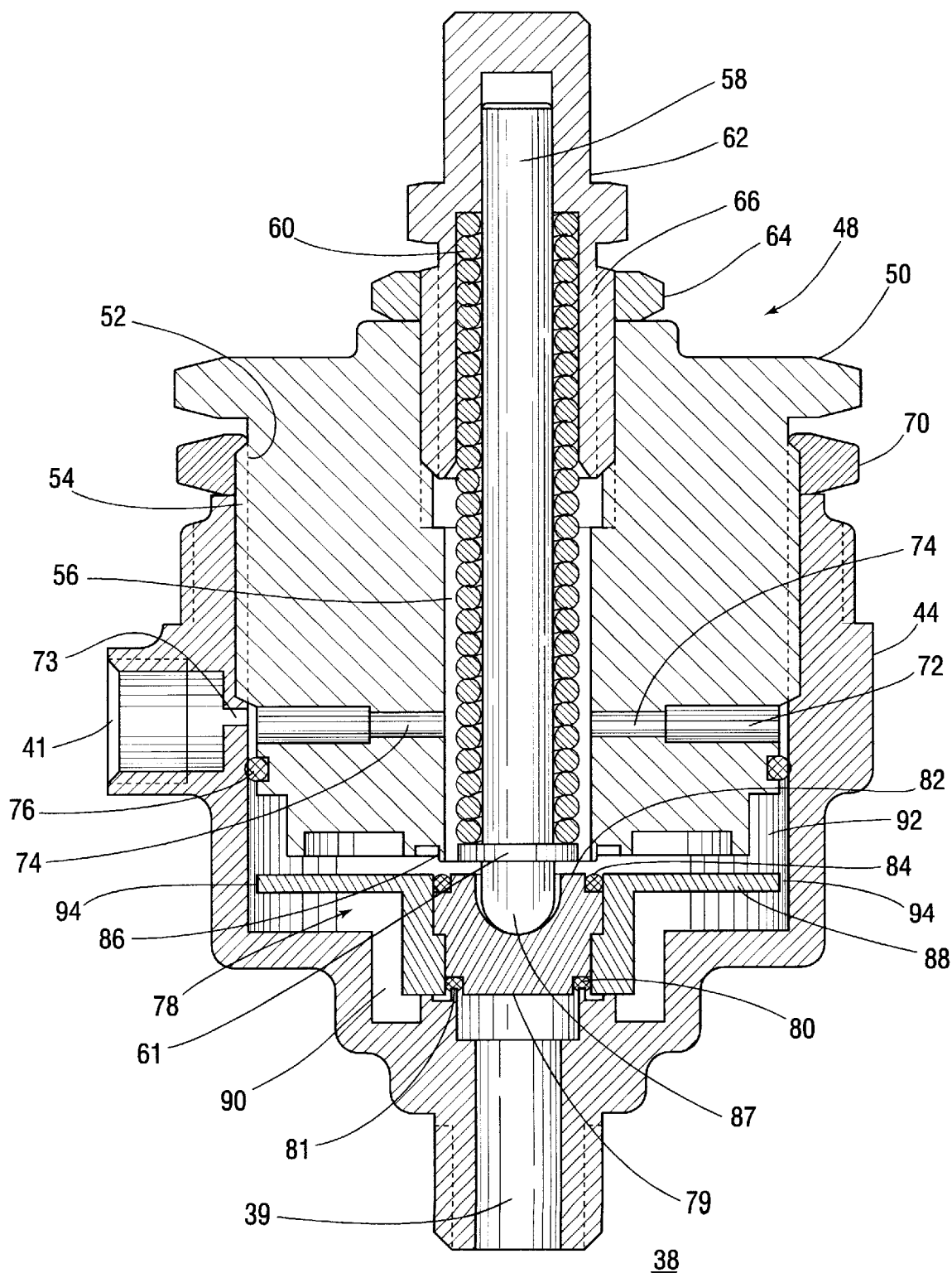
FIG. 3 is a longitudinal, sectional view of one embodiment of an assembled automatic drain valve made in accordance with this invention.
Figure 4:
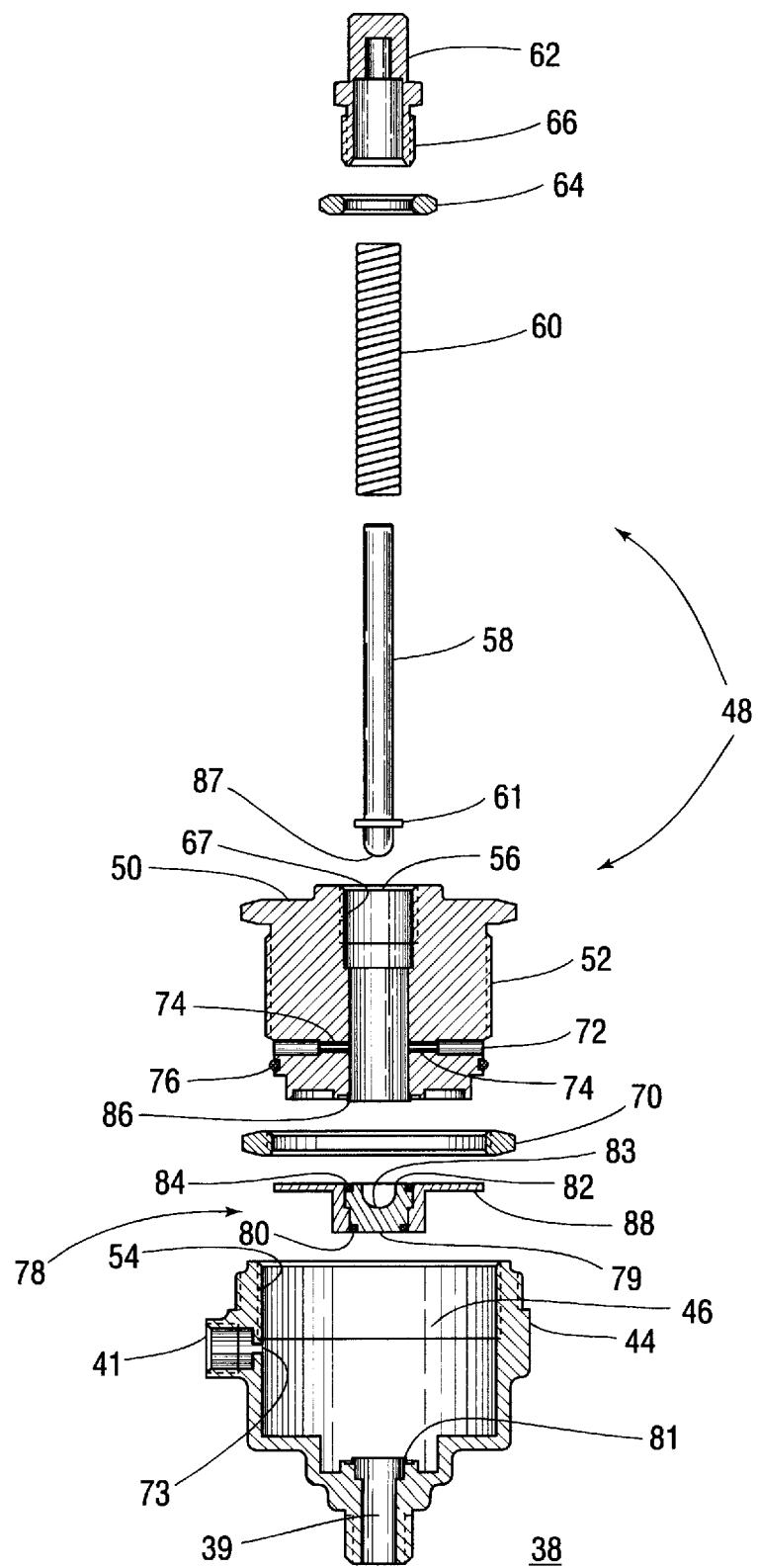
FIG. 4 is an exploded, longitudinal view of the drain valve shown in FIG. 3.

A preferred embodiment of the automatic drain valve 38 of this invention is shown in FIGS. 3 and 4. It includes a drain valve body 44 forming a central cavity 46 shown in FIG. 4, and having the inlet port 39 and the drain port 41 separated from one another across the central cavity 46.

A valve operating structure 48 is mounted within the central cavity 46. The valve operating structure 48 includes a differential adjustment screw 50 which has screw threads 52 formed about its periphery. These screw threads 52 mesh with screw threads 54 within the drain valve body 44. The differential adjustment screw 50 has a hole 56 formed about its axis. Mounted within the axial hole 56 is an adjustable pressure valve stem assembly comprising a valve stem 58, a valve spring 60 which fits around the valve stem 58 and exerts pressure on it through a shoulder 61, a pressure adjustment screw 62 and a pressure adjustment lock nut 64. Those skilled in the art will recognize that as an alternative a type of valve spring and surrounding structures could be provided which would enable the valve spring to operate without using the valve stem 58.

As shown in FIG. 3, the screw threads of the lock nut 64 fit on the screw threads 66 of the pressure adjustment screw 62, which in turn fit into corresponding screw threads 67 in the upper portion of axial hole 56. Additionally, a differential adjustment lock nut 70 has internal screw threads which fit into the screw threads 52 on the outside surface of the differential adjustment screw 50. An O-ring 76 fits within a shallow groove on the outside surface of the differential adjustment screw 50 and creates a seal between the differential adjustment screw 50 and the valve body 44.

The body of the differential adjustment screw 50 has a groove 72 extending part-way through it. A pair of holes 74 extend between the groove 72 and the axial hole 68. A vent orifice 73 is located in the valve body 44 between the groove 72 and the drain port 41.

A piston assembly 78 has an inlet face 79 which can seal the inlet port 39 when the piston assembly 78 is contiguous to it. The seal occurs when an inlet O-ring 80 located on the inlet face 79 contacts an inlet seat 81 located about the inside end of the inlet port 39. The area of the inlet face 79 exposed to the inlet pressure is sized to initially overcome the spring force of the valve spring 60 at a preselected high drain pressure of a compressor system. The piston assembly 78 and the O-ring 80 are moved away from the inlet seat 81. Liquid then can flow through the drain valve 38.

The piston assembly 78 also has a vent face 82 with an area larger than the area of the inlet face 80. The vent face 82 can seal a vent passageway leading to the drain port 41 from a first portion of the central cavity 46 in which the piston assembly 78 is mounted. The vent passageway includes the axial hole 56, the holes 74, the groove 72 and the orifice 73. The desired orifice 73 could be included at any point in the vent passageway, such as within the holes 74. The vent passageway is sealed when a vent O-ring 84 on the vent face 82 contacts a vent seat 86 located about the entrance to the vent passageway. The area of the vent face 82 is sized to overcome the spring force of the valve spring 60 for a portion of an operating cycle of a compressor when liquid has stopped flowing trough the drain valve 38 after the preselected high drain pressure has been reached. The O-ring 84 is forced against the vent seat 86 until the pressure within the compressor system decreases to a preselected low drain pressure. The piston assembly 78 and the O-ring 84 are then moved away from the vent seat 86. Liquid can then flow through the drain valve 38.

The distance between the vent seat 86 and the inlet seat 81 can be adjusted by turning the differential adjustment screw 50 within the valve body 44. Lock nut 70 must be loosened before turning the differential adjustment screw 50. The lock nut 70 is then tightened once a new distance is set between the vent seat 86 and the inlet seat 81.

A force from the valve spring 60 pushes the piston assembly 78 toward the inlet port 39. The spring 60 exerts its force through shoulder 61 of valve stem 58 and through valve stem end 87 which contacts an indentation 83 in the vent face 82 of the piston assembly 78. The force of the valve spring 60 on the piston assembly 78 can be adjusted by turning the pressure adjustment screw 62 within the differential adjustment screw 50. However, the lock nut 64 must be loosened before the pressure adjustment screw 62 can be turned. The lock nut 64 should be tightened once the appropriate spring force is set.

The piston assembly 78 also includes a dividing member, comprising the disk 88 in the preferred embodiment, which divides the portion of the central cavity 46 in which the piston assembly 78 is located into an inlet cavity 90 and a vent cavity 92. The inlet cavity 90 is located between the inlet port 39 and the disk 88, while the vent cavity 92 is located between the disk 88 and the vent passageway 56. The O-ring 76 seals off the vent cavity 92 from the groove 72.

In accordance with this invention an opening is provided between the inlet cavity 90 and the vent cavity 92. In the preferred embodiment shown in FIGS. 3 and 4 the opening is an annular clearance 94 between the outside periphery of the disk 88 and the inside wall of the valve body 44. The opening or clearance 94 has an area which is larger than the area of the vent orifice 73, but smaller than the other areas through which fluid flows between the inlet port 39 and the drain port 41. The vent orifice 73 controls the velocity of the flow of fluid, both liquid and air, through the drain valve 38. The annular clearance 94 allows fluid to flow at a controlled rate between the inlet cavity 90 and the vent cavity 92. Along with the vent orifice 73 the annular clearance 94 creates a pressure drop across disc 88 to cause the valve 38 to operate.

The area of the disc 88 controls the volume of fluid flow through the valve 38. The pressure of the fluid flowing across the disc 88 produces a force on the disc 88 in proportion to the area of the disc. This force moves the piston assembly 78, and thus the inlet O-ring 80, away from the inlet seat 81 and against the force of the spring 60 which is applied to the piston assembly 78 through the valve stem 58.

Those skilled in the art will recognize that the size of the drain valve 38 is chosen as a result of the application being made of this drain valve, the volume of condensate produced by the compressed air system for which the drain valve 38 is used and practical physical size. For the preferred embodiment of this invention, the process connection size selected was a ¼ inch n.p.t. (National Pipe Thread) connection. This connection size meets the size and flow requirements of many commercial and industrial compressed air systems. The preferred embodiment of the drain valve 38 was designed for a compressed air system cycling between a desired maximum pressure of 125 psi and a desired minimum pressure of 110 psi. However, it should be understood that the drain valve 38 can be designed to operate over any range of pressures which is selected. The drain valve 38 can even be used for those compressed air systems which operate at or above 500 psi and those compressed air systems which operate at or below 30 psi.

The high drain pressure at which the drain valve 38 will operate, as the pressure within the compressed air system is increasing, should be preselected at a value which is slightly lower than the desired maximum pressure of the compressed air system. Referring to FIG. 1, the reason is that if the setting of the pilot device 34 should change during operation due to heat, the compressor 30 may be unloaded at some pressure lower than the desired maximum pressure. The level set for the high drain pressure should be less than the lowest maximum pressure the compressed air system might reach resulting from potential changes of operating conditions of the compressed air system.

Similarly, the low drain pressure should be preselected at level above the desired minimum pressure of compressed air system so as to ensure that the drain valve operates in the event the pilot valve setting changes during operation to some higher pressure level. In the preferred embodiment of the drain valve of this invention shown in FIG. 3, the lower drain pressure was set at 113 psi and the high drain pressure was set at 123 psi for the compressor system which operated between 110 psi and 125 psi.

The cross-sectional area of the inlet port 39 is determined by the size of the process connection. The inside diameter of a ¼ inch n.p.t. pipe is 0.364 inches, resulting in an area of 0.104 square inches.

The cross-sectional area of the inlet seat 81 can be equal to or greater than that of the inlet port 39. The larger the area of the inlet seat 81, the shorter the distance the piston assembly 78 will have to travel to fully open the drain valve 38. However, a larger area of the inlet seat 81 will allow a greater force to be produced against the inlet face 79 by the pressure of the fluid within the inlet port 39. A greater spring force of the spring 60 is thus required to hold the piston assembly 78 and the inlet O-ring 80 against the inlet seat 81 until the high drain pressure is reached. Based on experience with pilot valves and the availability of a standard sized O-ring to use for the O-ring 80, in the preferred embodiment the inlet seat 81 has a diameter of 0.469 inches measured at the outside of the seat. Thus the inlet face 79 has an area of 0.1728 square inches. This size keeps the spring size and piston travel within reasonable limits.

The cross-sectional area of the vent seat 86 must be larger than the cross sectional area of the inlet seat 81 to allow pressure from the inlet port 39 to hold the piston 78 against the force of the spring 60 when the O-ring 84 is forced against the vent seat 86. As will be more fully explained below, the drain valve 38 operates to drain liquid at both a high drain pressure, which is slightly lower than the maximum pressure of the compressor system, and at a low drain pressure which is slightly larger than the lowest pressure at which the compressor system will operate. For a given differential between the high drain pressure and the low drain pressure, a larger area for the vent seat 86 relative to the area of the inlet seat 81 requires a higher spring rate for the spring 60 to operate the piston assembly 78 between the valve seat 81 and 86. Conversely, for a given differential between the high drain pressure and the low drain pressure, a smaller area of vent seat 86 relative to the area of the inlet seat 81 requires a lower spring rate for the spring 60 to operate a piston 78 through the same distance of travel.

In the preferred embodiment of this invention, the vent seat has a diameter of 0.516 inches measured on the inside of the seat. As a result, the vent seat has an area of 0.209 square inches.

The area of the dividing member 88, sometimes referred to as a piston disc, is initially set at a diameter of at least about 300% larger than the area of the inlet port. The area of the dividing member 88 may have to be adjusted later in the design process of the valve 38.

The inlet face 79 and the vent face 82 must travel far enough away from the inlet seat 81 and the vent seat 86, respectively, to ensure enough liquid flows through the valve 38 to drain the receiver within a reasonable time. A longer travel of the piston assembly 78 may require a more elaborate piston guide design to prevent the binding of the piston assembly 78 during operation of the valve 38. Thus, the travel distance of the piston assembly 78 should be kept at a minimum. In the preferred embodiment, a satisfactory travel distance of the piston assembly 78 was determined through experimentation to be 0.040 inches.

The area of the inlet seat 81, the area of the vent seat 86 and the travel distance of the piston assembly 78 are used to determine the spring rate of the spring 60 as follows:

a. First determine the high drain pressure and the low drain pressure. e.g. 110 psi and 100 psi.
b. Multiply the area of the inlet seat 81 by the high drain pressure. e.g. 0.1728×110=19.008.
c. Multiply the area of the vent seat 86 by the low drain pressure. e.g. 0.209×110=20.9.
d. Subtract the smaller value from the larger value. e.g. 20.9−19.008=1.892.
e. Divide the result by the travel distance of the piston assembly 78 to obtain the spring rate. e.g. 1.892/0.04=47.3.

The disc clearance area 94 must be smaller than the area of the inlet port 39 so that a differential pressure can be created across the disc 88. Additionally, the area of the vent orifice 73 must be smaller than the disc clearance area 94 to allow the vent orifice 73 to control flow through the valve 38.

In the preferred embodiment of this invention, the disc clearance area 94 is first set to a minimum value such as 0.045 square inches. The area of the vent orifice 73 is then first set to a value smaller than the disc clearance area 94, such as 0.0322 square inches. This is about two thirds of the disc clearance area 94. The disc clearance area 94 and the vent orifice area 73 are adjusted to optimize the performance of the valve 38. The objective is to find the maximum size of both of these areas at which the valve can operate effectively. Adjustments are made according to the following guidelines:

a. During the high drain pressure stroke an oscillation of the piston assembly 78 up and down indicates that either the area of the vent orifice 73 is too small or the disc clearance area 94 is too large. Since the disc clearance area 94 was initially set to a minimum value, the area of the vent orifice 73 should be increased gradually until the piston assembly 78 operates smoothly through its high drain pressure stroke.
b. During the low drain pressure stroke an oscillation of the piston assembly 78 up and down indicates that either the disc clearance area 94 is too small or the area of the vent orifice 73 is too large. The disc clearance area was initially set at a minimum area. Thus, the disc clearance area 94 should be increased gradually until the piston assembly 78 operates smoothly through the low drain pressure stroke.
c. The adjustments suggested in Steps a. and b. above should be made gradually and the results recorded until the piston assembly 78 operates smoothly through both of its strokes. As indicated above, the adjustments should be made until the maximum size is reached for both the area of the vent orifice 73 and the disc clearance area 94.

For the preferred embodiment of this invention, the area of the vent orifice was finally established as 0.0276 square inches and the disc clearance area was finally established as 0.0515 square inches.

Up to this point, air pressure alone is used to establish the dimensions of the valve components. However, the diameter of the disc 88 is established by using pressurized water at the inlet port 39. The pressure of the water at the inlet port 39 is cycled through the high drain pressure and the low drain pressure determined for the valve 38. If the piston assembly 78 closes the valve 38 after the high drain pressure is reached and before the water is drained through the valve 38, the area of the disc 88 is too large and must be reduced. The reason is that the water pressure over this area of the disc is overcoming the spring force of the spring 56 before water has been totally vented and before air enters into the valve 38 through the inlet port 39. If, on the other hand, a weak stream of water is observed flowing from the vent port 41, the size of the disc 88 is too small. The pressure over the area of disc 88 provides insufficient force to lift the piston assembly 78 far enough away from the inlet seat 81 to allow a strong, steady stream of water to flow to the valve 38. In either event, the size of the disc 88 must be adjusted until a strong, steady stream of water is observed flowing through the vent port 41. This steady stream of water indicates that the piston assembly 78 is hovering at mid travel between the inlet seat 81 and the vent seat 86.

Those skilled in the art will realize that in the course of adjusting the size of the disc 88 the disc clearance area 94, which was established previously, must be maintained.

Operation of Drain Valve

The operation of the drain valve 38 in accordance with this invention is best understood by referring initially to FIGS. 1 and 2 along with FIG. 3. The compressed air system 20 is first operated by starting the engine 24 so as to cause the compressor 30 to raise the pressure in the receiver 28. Since the pressure within the receiver 28 is low at this time, the pilot device 34 causes the unloader 22 to allow the compressor 30 to build up pressure within the receiver 28.

Referring to FIG. 2, along with FIG. 1, the pressure within the receiver 28, and thus within compressed air system 20, is allowed to fluctuate from a desired maximum pressure, shown at points 96 and 98, to a desired minimum pressure shown at points 100 and 102. When the desired maximum pressure, such as at the point 96, is sensed by the pilot device 34, the unloader 22 unloads the compressor so that it can no longer pressurize the receiver 28. When the pressure within the compressed air system 20 drops to the desired minimum pressure level, such as at point 100, the pilot device 34 causes the unloader 22 to load compressor 30. The compressor 30 then increases the pressure within the receiver 28 and thus in the compressed air system 20.

Assume that when the compressed air system is started up condensate 37 has previously accumulated at the bottom of the receiver 28 from a prior use of the compressed air system 20. The compressor 30 increases the pressure within the receiver 28 toward the desired maximum pressure of the compressed air system 20 at point 96 on FIG. 2, until a pre-selected high drain pressure is reached at point 104. The position of the piston assembly 78 at this point in the operation of the drain valve is shown in FIG. 5(*a*).

Referring now to FIG. 3 along with FIG. 5(*a*), the area of the inlet face 79 is of a size which allows the force of the spring 60 exerted on the piston assembly 78 by the valve stem 58 to be overcome by the pre-selected high drain pressure at point 104 shown in FIG. 2. This pressure exerted on the condensate at the inlet port 39 and thus on the area of the inlet face 79. This causes the O-ring 80 located around the inlet face 79 to move away from the inlet seat 81.

The position of the piston assembly 78 at this point in the operation of the drain valve 38 is shown in FIG. 5(*b*). Condensate then begins to drain from the inlet port 39 and through a flow path comprising the inlet cavity 90, the annular clearance 94 and the vent cavity 92. Referring now to FIG. 3 as well, the condensate then flows through the vent passageway including the axial hole 56, the holes 74, the groove 72 and the vent orifice 73 to the drain port 41. Referring to FIG. 5(*b*), the flow of condensate liquid beneath and around the disc 88 moves the piston assembly 78 away from the inlet seat 81 and toward the vent seat 86. The opening between the piston assembly 78 and the inlet seat 81 becomes larger, allowing more water to enter the valve 38 at a higher rate of flow.

If this opening was allowed to continue to get larger, the increase in liquid flow would result in the piston assembly 78 closing against the vent seat 86 before the water was completely expelled from the receiver 28. To prevent this, the annular clearance 94 and the small vent orifice 73 are carefully sized to control the maximum distance the piston assembly 78 moves from the inlet seat 81 during liquid flow by controlling the maximum flow rate through the valve 38.

As seen in FIG. 3, the condensate continues to flow through the holes 74 and the groove 72 to the vent orifice 73 where its flow is restricted. Additionally, referring back to FIG. 5(*b*), as the pressure of the flow of condensate within the inlet cavity 90 forces the piston assembly 78 toward the vent seat 86, the distance between the valve seat 86 and the O-ring 84 closes. The piston assembly and the vent seats 81 and 86 act as variable orifices, allowing pressure to build up within the vent cavity 92 to counteract the pressure of the condensate within the inlet cavity 90. As a result of the flow restriction from the vent orifice 73, the controlled flow through the gap 94 and the variable orifices, the piston assembly 78 hovers within the inlet cavity 90 and the vent cavity 92 in the position shown in FIG. 5(*b*) as long as condensate flows from the inlet port 39 and through the drain port 41, and until such time as all of the liquid condensate has been drained from the receiver 28 shown in FIG. 1. That time when the draining stops is shown as point 106 in FIG. 2.

Referring to FIG. 3 and FIG. 5(*b*), once all of the liquid has been removed from the receiver 28, compressed air begins to flow through the drain port 39 and into the inlet cavity 90. The compressed air expands rapidly within the inlet cavity 90 substantially increasing the force on the disc 88. The increased force on the disc 88 drives the piston assembly 78 against the force of the valve spring 60, transmitted through the valve stem 58 and the vent face 82, and moves the piston assembly 78 toward the vent seat 86. The annular clearance 94 is too small to allow a sufficient volume of air to pass from the inlet cavity 90 to the vent cavity 92 before the vent face 82 closes off the vent passageway. Thus, the vent O-ring 84 contacts the vent seat 86 as shown in FIG. 5(*c*).

Within a short time the pressure equalizes on both sides of the disc 88. The valve spring 60 has been compressed, increasing the force imposed through the valve stem 58 on the piston assembly 78. However, the area of the vent face 82, which is at atmospheric pressure, is larger than the area of the inlet face 79. Since all areas of the piston assembly 78 except for the vent face 82 are subject to the pressure of the compressed air through the inlet port 39, the force which counteracts the force of the valve spring 60 against the valve stem 58 is equal to the pressure of the compressed air multiplied by the area of the vent face 82. This increased force, caused by the fact that the area of the vent face 82 is larger than the area of the inlet face 79, is sufficient to overcome the increase in the force due to compression of the valve spring 60 resulting from the movement of the piston assembly 78 against the valve stem 58. The vent O-ring 84 continues to contact the vent seat 86 during the portion of the compressor's operating cycle.

Referring once again to FIGS. 1 and 2, after the condensate has stopped draining from the receiver 28 as explained above, the pressure within the compressed air system 20 continues to decrease toward the desired minimum pressure 100 as the compressed air within the system 20 is used. At a pre-selected low drain pressure 108 the drain valve 38 of this invention operates once more to remove liquid condensate from the receiver 28.

The sequence of operation begins with FIG. 5(*c*) and ends with FIG. 5(*a*). Just before the pre-selected low drain pressure 108 is reached, the valve assembly 78 is in the position shown in FIG. 5(*c*) as explained above. Liquid condensate has filled the inlet cavity 90, the clearance 94 and the other areas surrounding the piston assembly 78. The pressure on this liquid decreases to a level which allows the force of the spring 60 to move the piston assembly 78 toward the inlet port 39. Thus, the O-ring 84 is moved away from the valve seat 86 as shown in FIG. 5(*b*). Condensate then begins to drain from the inlet port 39 and through a flow path comprising the inlet cavity 90, the annular clearance 94, and the vent cavity 92. Referring to FIG. 3, as well, the condensate then flows through the vent passageway including the axial hole 56, the holes 74, the groove 72 and the vent orifice 73 to the drain port 41. Referring again to FIG. 5(*b*), the flow of condensate liquid beneath and around the disc 88 prevents the force of the spring 60 from moving the O-ring 80 onto the inlet seat 81 as long as this liquid continues to flow through the valve 38.

As explained above, with regard to the operation of the drain valve 38 at the high drain pressure, the operation of the valve 38 at the low drain pressure causes the piston assembly 78 to hover between the vent passageway and the inlet port 39 until all the liquid has drained from the inlet port 39 and through the drain valve 38. At that point in time, the liquid stops flowing. The force of expanding compressed air coming through the inlet port 39 and into the inlet cavity 90 causes the vent face 82 to move toward the vent passage. The vent O-ring 84 momentarily moves toward the vent seat 86. Shortly thereafter, the force of the compressed air expanding within the inlet cavity 90 is dissipated. An equilibrium condition sets in and the force of the spring 60 on the valve stem 58 moves the piston assembly 78 toward the inlet port 39. The inlet O-ring 80 contacts the inlet seat 81 to close the valve 38 as shown in FIG. 5(*a*). Referring to FIG. 2, the liquid draining is completed at point 110 of the compressor cycle.

The piston assembly 78 remains in the position shown in FIG. 5(*a*) until the compressor 30 raises the pressure of the receiver 28 to the preselected high drain pressure point 112. The valve 38 then operates as explained above to allow liquid to drain from the receiver 28 for a liquid draining shown in FIG. 2. When preselected low drain pressure point 114 is reached, the valve 38 operates as explained above during the liquid draining which is also shown in FIG. 2. These liquid draining cycles repeat during the operation of the compressor system 20 shown in FIG. 1.

Figure 7:
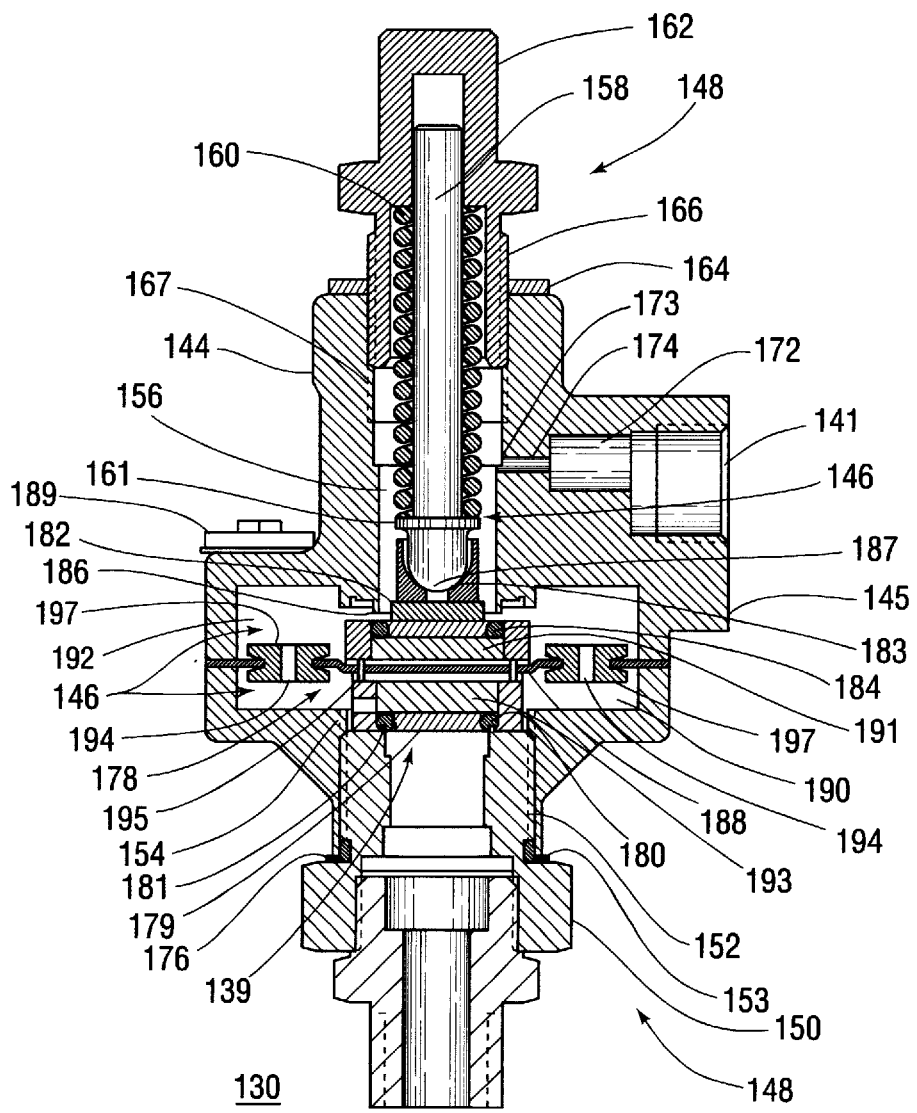
FIG. 7 is a longitudinal, sectional view of still another drain valve made in accordance with principles of this invention.

FIG. 7 shows another embodiment of a drain valve which is constructed in accordance with the principles of this invention. A drain valve 138 has components with configurations which are somewhat different than those of the drain valve 38 shown in FIGS. 3–5. However, many of the components of the drain valve 138 shown in FIG. 7 correspond in their functions to the components of the drain valve 38 shown in FIGS. 3–5. Each of these corresponding components of the drain valve 138 is marked with a numeral which is 100 units higher than the numeral of the corresponding component shown in the drain valve 38. Those skilled in the art will recognize that other drain valves having still different configurations of components can be constructed in accordance with the principles of this invention.

The drain valve 138 includes a valve body 144 which forms a central cavity 146. In this configuration of this invention, the central cavity 146 includes the hole 156 as well as an inlet cavity 190 and a vent cavity 192. The drain valve body 144 further includes an inlet port 139 and a drain port 141 which are separated from one another by the central cavity 146.

The drain valve 138 has a valve operating structure 148 having components which are separated from one another. The valve operating structure 148 includes a differential adjustment screw 150 which has screw threads 152 about its periphery. These screw threads mesh with mating screw threads 154 within the inlet end of the drain valve body 144. An O-ring 176 fits within a shallow groove on the outside surface of the differential adjustment screw 150 and creates a seal between the differential adjustment screw 150 and the valve body 144. Shims 153 fit between the inlet end of the valve body 144 and a shoulder of the valve body 150. As will be explained below, the size of the shims 153 can be changed to adjust the effective distance within the valve 138 between the inlet port 139 and a vent passageway which includes the axial hole 156.

The valve operating structure 148 also includes an adjustable pressure valve stem assembly comprising a valve stem 158, a valve spring 160 which fits around the valve stem 158 and exerts pressure on it through a shoulder 161, a pressure adjustment screw 162 and a pressure adjustment lock nut 164. The screw threads of the lock nut 164 fit on screw threads 166 of the pressure adjustment screw 162, which in turn fit into corresponding screw threads 167 in the upper portion of the axial hole 156.

The drain port 141 is located in drain extension 145 of the drain valve body 144. The drain port 141 is included in a vent passageway which also includes holes 172 and 174, a vent orifice 173 and the hole 156 of the central cavity 146. Thus, in the embodiment of this invention shown in FIG. 7 the vent orifice 173 has the holes 174 and 172 between it and the drain port 141.

A piston assembly 178 is included within the central cavity 146. The piston assembly 178 has an inlet face 179 which can seal the inlet port 139 when the piston assembly 178 is contiguous to it. The seal occurs when O-ring 180 located on the inlet face 179 contacts an inlet seat 181 located at the inside end of the differential adjustment screw 150 at the inside end of the inlet port 139.

The piston assembly 178 also has a vent face 182 with an area larger than the area of the inlet face 179. The vent face 182 can seal the vent passageway leading to the drain port 141 from the portion of the central cavity 146 in which the piston assembly 178 is mounted. The vent passageway is sealed when a vent O-ring 184 located on the vent face 182 contacts a vent seat 186 located within the drain valve body 144 and about the entrance to the hole 156 of the vent passageway.

The distance between the vent seat 186 and the inlet seat 181 can be adjusted by changing the size of the shims 153 located between the inlet end of the valve body 144 and the shoulder of the differential adjustment screw 150. The differential adjustment screw is then turned so that the shims 153 fit snugly between the inlet end of the valve body 144 and the shoulder of the differential adjustment screw 150.

A force from the valve spring 160 pushes the piston assembly 178 toward the inlet port 139. The spring 160 exerts its force through a shoulder 161 of the valve stem 158 and through a valve stem end 187 which contacts an indentation 183 in the vent face 182 of the piston assembly 178. The force of the valve spring 160 on the piston assembly 178 can be adjusted by turning the pressure adjustment screw 162 within the valve body 144. However, the lock nut 164 must be loosened before the pressure adjustment screw 162 can be turned and should be tightened once the appropriate spring force is set.

The piston assembly 178 also includes a dividing member 188 which divides the portion of the central cavity 146 in which the piston assembly 178 is located into an inlet cavity 190 and a vent cavity 192. The inlet cavity 190 is located between the inlet port 139 and the dividing member 188, while the vent cavity 192 is located between the dividing member 188 and the hole 156 of the vent passageway.

In the embodiment of this invention shown in FIG. 7 the dividing member 188 comprises a diaphragm constructed out of a flexible polymer membrane. The diaphragm 188 can be made out of rubber or any other material which has the flexibility to allow the piston assembly 178 to move back and forth within the central cavity 146 as required for the operation of the drain valve 138. The piston assembly 178 includes a vent face assembly 191 on which the vent O-ring 184 is mounted and an inlet face assembly 193 on which the inlet O-ring 180 is mounted. The vent face assembly 191 and the inlet face assembly 193 are shown to be connected together through the diaphragm 188 by a plurality of fasteners 195.

The purpose is to cause the vent face assembly 191 and the inlet face assembly 193 to move back and forth together on the diaphragm 188 between the inlet seat 181 and the vent seat 186. Those skilled in the art will recognize that this can be accomplished through the use of mechanisms other than the fasteners 195 to directly connect the vent face assembly 191 to the inlet face assembly 193 through the membrane 188. Alternatively, as a substitute for fasteners 195, a light spring could be mounted within the area of the inlet port 139 to push the inlet face assembly 193 against the diaphragm 188 and through the diaphragm 188 against the vent face assembly 191. The light spring would actually be holding the piston assembly 178 against the valve stem 158. Such a spring would be required as and after the piston assembly 178 moves the inlet O-ring 180 and the inlet face 179 away from the inlet seat 181.

Figure 6:
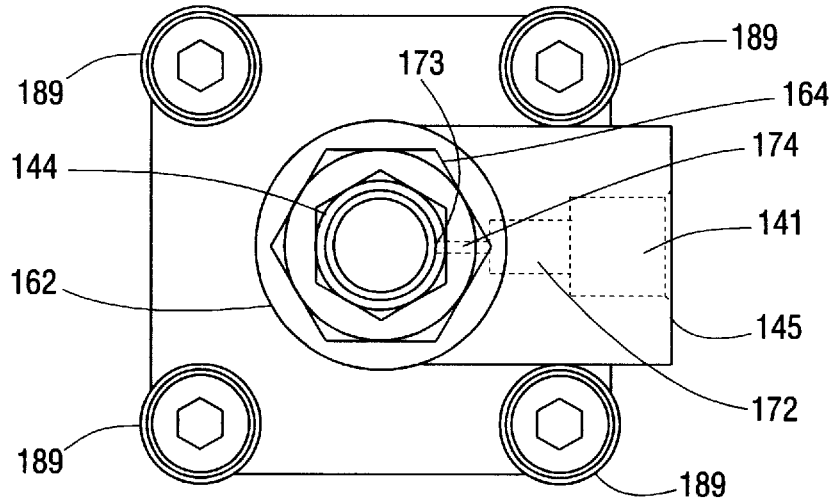
FIG. 6 is a top view of an automatic drain valve made in accordance with this invention.

To enable the diaphragm 188 to be installed in the drain valve 138, the drain valve body 144 is cut into two sections in the vicinity of the central cavity 146 where the inlet cavity 190 and the vent cavity 192 are located. The four corners of the drain valve body 144 are made up of solid material. This enables fasteners such as bolts 189, shown in FIG. 6, to connect the two halves of the drain valve body 144 together after diaphragm 188 has been installed between them.

In accordance with this invention an opening is provided between the inlet cavity 191 and the vent cavity 192 by holes 194 located in a pair of grommets 197 which are mounted in the diaphragm 188. The two holes 194 have a total area which is larger than the area of the vent orifice 173, but smaller than the other areas through which fluid flows between the inlet port 139 and the drain port 141. As explained above with respect to the drain valve 38 shown in FIGS. 3–5, the vent orifice 173 controls the velocity of the flow of fluid, both liquid and air, through the drain valve 138. The area of the holes 194 allows fluid to flow at a controlled rate between the inlet cavity 190 and the vent cavity 192. Along with the vent orifice 173, the holes 194 create a pressure drop across the diaphragm 188 which causes the valve 138 to operate.

The area of the diaphragm 188 controls the volume of fluid flow through the valve 138. The pressure of the fluid flowing across the diaphragm 188 produces a force on the diaphragm 188 in proportion to the area of that diaphragm. This force moves the piston assembly 178, and thus the inlet O-ring 180, away from the inlet seat 181 and against the force of the spring 160 which is applied to the piston assembly 178 through the valve stem 158.

The basic design of the drain valve 138 is the same as that of the drain valve 38, except that the diaphragm 188 and the pair of grommets 197 with the holes 194 area used in place of the disc 88 and the clearance 94 between the end of the disc 88 and the sidewall of the drain valve body 44 of the valve 38. Thus, the size of the drain valve 138 is chosen to fit the application being made of this drain valve, the volume of condensate produced by the compressed air system for which the drain valve is used and the desired range of pressures over which the drain valve is to operate. The same design criteria are used with regard to the drain valve 138 shown in FIG. 7 as area used with regard to the drain valve 38 shown in FIGS. 3–5.

Referring to FIG. 2 along with FIG. 7, the procedures set forth above should be used to determine the desired maximum pressure and the desired minimum pressure of a compressed air system for which the drain valve 138 will be used. The high drain pressure and the low drain pressure are then selected. Once the size of the process connection on the compressor system is known, the cross-sectional area of the inlet port 139 can be determined. The inlet seat 181 can be made equal to or greater than the area of the inlet port 139. As explained above, the size of the area of the inlet seat 181 is chosen by the distance it is desired to have the piston assembly 178 travel to fully open the drain valve 138, as well as the spring force of the spring 160 desired to be used to hold the piston assembly 178 and the inlet O-ring 180 against the inlet seat 181 until the high drain pressure is reached.

The cross-sectional area of the vent seat 186 must then be chosen to be larger than the cross-sectional area of the inlet seat 181. This allows pressure from the inlet port 139 to hold the piston 178 against the force of the spring 160 when the O-ring 184 is forced against the vent seat 186. The area of the inlet seat 181, the area of the vent seat 186, and the desired travel distance of the piston assembly 178 are used to determine the spring rate of the spring 160 as set forth above.

As indicated above, the area of the holes 194 in the grommets 197 must be smaller than the area of the inlet port 139 so that a differential pressure can be created across the disc 188. Additionally, the area of the vent orifice 173 must be smaller than the area of the holes 194 to allow the vent orifice 173 to control flow through to valve 138.

The area of the holes 194 is determined in the same manner as the disc clearance 94 described above with respect to the valve 38. Grommets with larger or smaller holes can be exchanged for the grommets 197. Or grommets with holes having a smaller area than required can have their holes bored or drilled to enlarge them as needed. Alternatively, more than two grommets can be used. It is desirable to have grommets installed in the diaphragm 188 at equal distances from one another so as to balance the effects of the operation of the valve around the total surface of the diaphragm 188.

Additionally, the diameter of the diaphragm 188 is established by cycling pressurized water through the high drain pressure and the low drain pressure over which the valve 138 is to be used. If the piston assembly 178 closes the valve 138 after the high drain pressure is reached and before all of the water is drained through the valve 138, the area of the diaphragm 188 is too large and must be reduced. If, on the other hand, a weak stream of water is observed flowing from the vent port 141, the size of the diaphragm 188 is too small. In either event, the size of the diaphragm 188 must be adjusted until a strong, steady stream of water is observed flowing through the vent port 141. This steady stream of water indicates that the piston assembly 178 is hovering at mid travel between the inlet seat 181 and the vent seat 186 as water flows through the holes 194 and the grommets 197.

Those skilled in the art will realize that the size of the membrane 188 may have to be adjusted by adjusting the size of the sidewalls of the drain valve body 144 adjacent the inlet cavity 190 and the vent cavity 192.

Figure 5A:
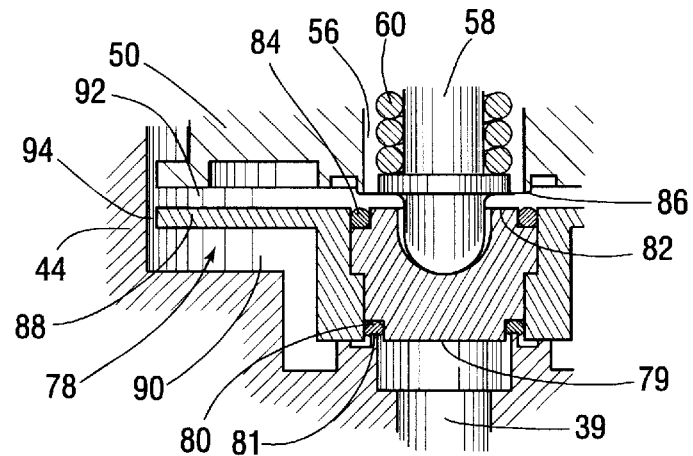
FIGS. 5(a)–(c) are partial, sectional views of the operation of the piston assembly of one embodiment of this invention as the automatic drain valve operates at a pre-selected high drain pressure.
Figure 5B:
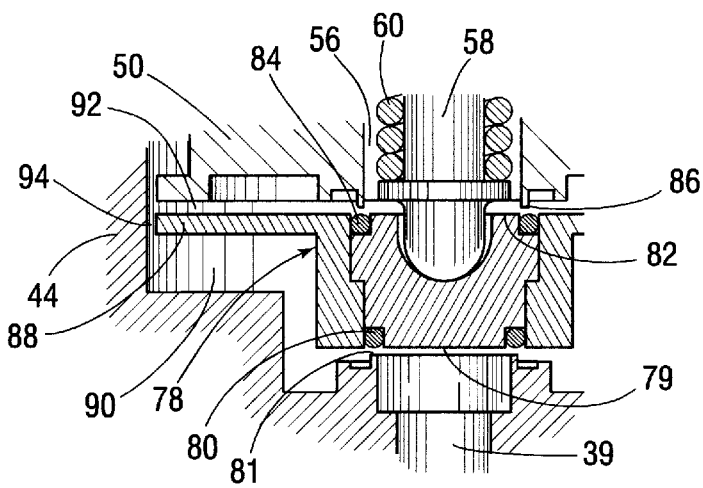
Figure 5C:
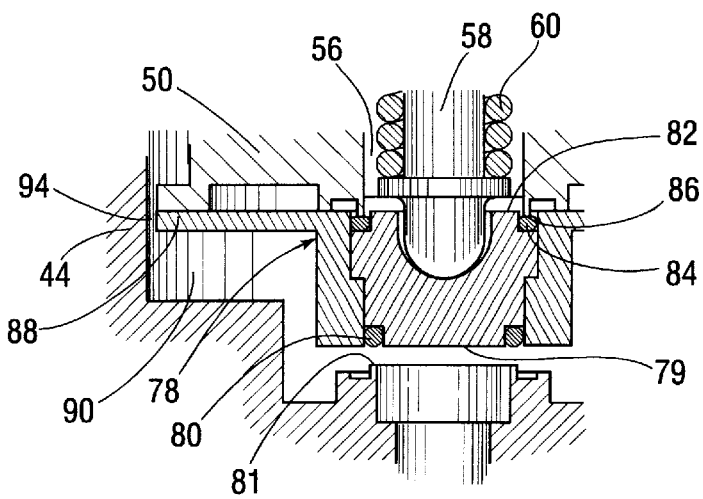
Figure 8:
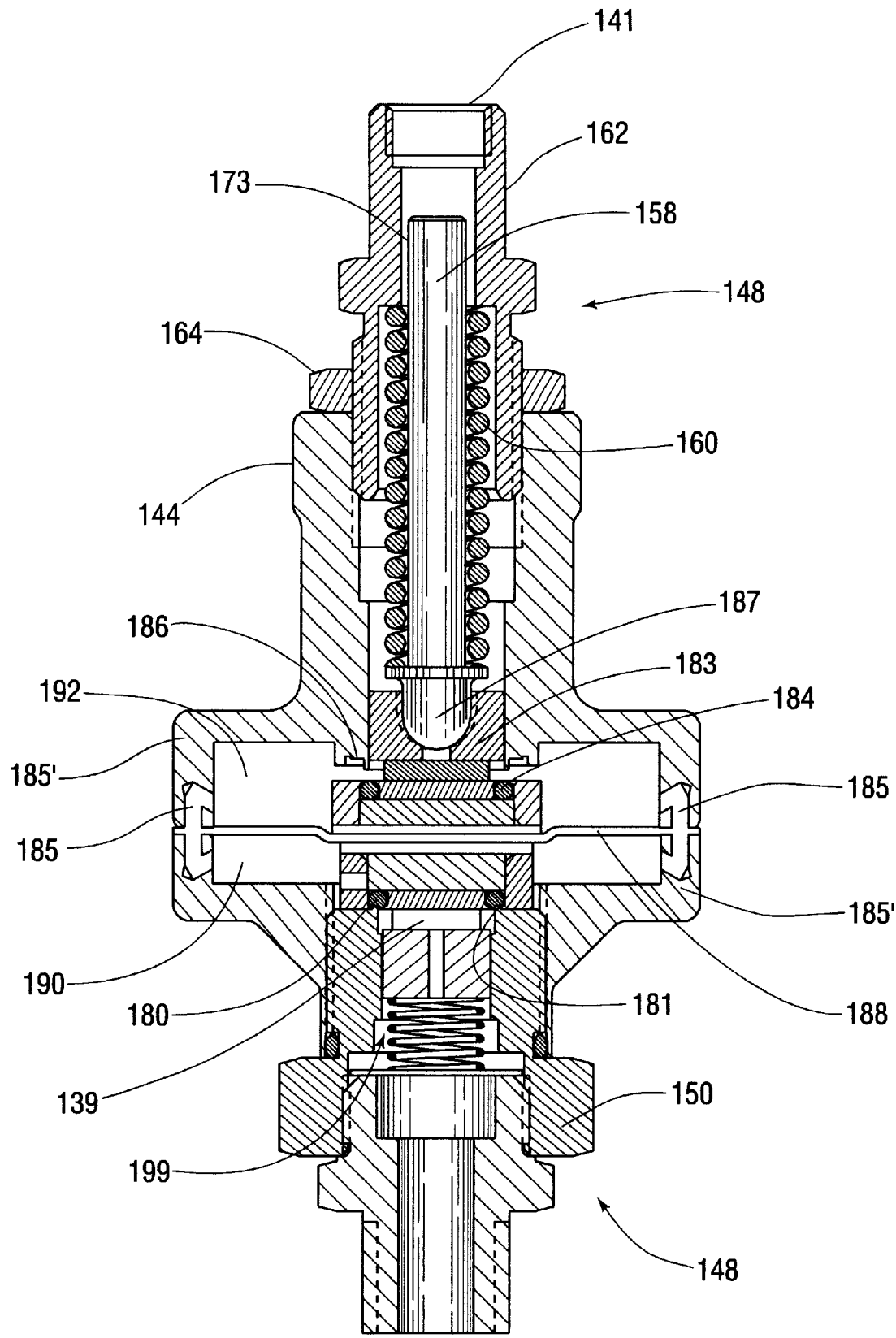
FIG. 8 is a longitudinal, sectional view showing examples of variations of a drain valve made in accordance with this invention.

The operation of the drain valve 138 shown in FIGS. 7 and 8 is similar to the operation of the drain valve 38 shown in FIGS. 5a–5c and will not be described in detail. The basic difference between the valve 138 and the valve 38 is that the diaphragm 188 is substituted for the disc 88 and the holes 194 in the grommets 197 are substituted for the clearance 94.

Referring the FIGS. 1 and 2 along with FIG. 7, assume the compressed air system 20 of FIG. 1 is being started and condensate has accumulated in the receiver 28 as a result of the prior operation of compressed air system 20. As the pressure within the receiver 28 is increased toward the desired maximum pressure shown as point 96 in FIG. 2, the area of the inlet face 179 of the piston assembly 178 in FIG. 7 is of a size which causes the force of the spring 160, exerted by the valve stem 158, to hold the O-ring 180 against the inlet seat 181 until the pressure within the receiver 28 reaches the preselected high drain pressure at the inlet port 139. The preselected high drain pressure is point 104 in FIG. 2. This causes the inlet face 179 to move away from the inlet port 139 which results in inlet O-ring 180 moving away from inlet seat 181. Liquid thus drains through the now opened inlet port 139 and through a flow path comprising the inlet cavity 190, the holes 194 and the grommets 197, the vent cavity 192. Liquid continues to flow through the vent passageway which includes a portion of the hole 156 in the valve body 144, the vent orifice 173, the holes 174 and 172 and the drain port 141.

The relative sizes of the areas of the holes 194 in the grommets 197 and the vent orifice 173 prevent the vent face 182 on the piston assembly 178 from moving to a closed position against the vent passageway while water continues to flow through the valve 138. In other words, the vent O-ring 184 is held away from the vent seat 186 until compressed air begins flowing through the flow path described above. At that time, the compressed air expands rapidly within the inlet cavity 190, substantially increasing the force on the membrane 188. The increased force on the membrane 188 drives the piston assembly 178 against the force of the valve spring 60 which is transmitted through the valve stem 158 and the vent face 182. Thus, the increased force on the membrane 188 moves the piston assembly 178, including vent O-ring 184, toward the vent seat 186. The area of the holes 194 is too small to allow sufficient volume of air to pass from the inlet cavity 190 to the vent cavity 192 before the vent face 182 closes off the vent passageway. Thus, the vent O-ring 184 contacts the vent seat 186 to seal the vent passageway, including the drain port 141, from the compressed air flowing from the inlet port 139. The draining of liquid from the valve 138 has terminated as shown at point 106 in FIG. 2.

The pressure in the compressed air system 20, shown in FIG. 1 decreases toward a low drain pressure shown at point 108 in FIG. 2. The area of the vent face 182 of the piston assembly 178 is of a size such that the resulting force from the fluid in the inlet cavity 190 and the vent cavity 192 prevents the spring force being exerted from the spring 160 and through the valve stem 158 from being overcome until the pre-selected low drain pressure at point 108 reached at the inlet port 139. At that point in the operating cycle of the compressed air system, the vent face 182 is moved away from the vent passageway causing the vent O-ring 184 to move away the vent seat 186. This allows liquid to drain from the inlet port 139 and through the flow path comprising the inlet cavity 190, the holes 194 of the grommets 197, the vent cavity 192, the vent passageway including the hole 156, the vent orifice 173, the holes 174 and 172, and the drain port 141.

The relative sizes of the areas of the holes 194 and the vent orifice 173 prevent the inlet face 179 on the piston assembly 178 from moving to a closed position with respect to the inlet port 139 while water continues to flow through the valve 138. This causes the piston assembly 178 to hover between the vent seat 186 at the entrance of the vent passageway and the inlet seat 181 at the inlet port 139 until all the liquid has drained from the inlet port 139 and through the drain valve 138. This is the end of the low pressure liquid drain cycle shown at point 110 in FIG. 2. Compressed air now begins to enter into the inlet cavity 190.

The force of expanding compressed air from the inlet port 139 into the inlet cavity 190 causes the piston assembly 178, including the vent face 182, to move toward the vent passage. The vent O-ring 184 momentarily moves toward the vent seat 186. Shortly thereafter, the force of the compressed air expanding within the inlet cavity 90 is dissipated. An equilibrium condition sets in, and the force of the spring 160 on the valve stem 158 moves the piston assembly 178 toward the inlet port 139. The inlet O-ring 180 contacts the inlet seat 181 to close the valve 138.

The valve 138 remains closed until pressure within the compressed air system in which it is installed increases to the high drain pressure once again, shown as point 112 in FIG. 2. The valve 138 initiates a liquid drain period at point 112 as it did at point 104, which was explained above. Thereafter, the valve 138 initiates liquid drain periods each time the pressure within the compressed air system reaches either the preselected high drain pressure or the preselected low drain pressure. The relative sizes of the areas of the holes 194 and the vent orifice 173 cause each drain period to last until all the liquid present at the inlet port 139 has been drained through the valve 183. Thus, each liquid drain cycle could be of a different duration as shown in FIG. 2.

Those skilled in the art of designing drain valves will recognize that drain valves constructed in accordance with the principles of this invention can have many different configurations. Two of these configurations are described above and shown in the accompanying drawings for illustrative purposes only. By way of example, it is contemplated that the embodiment of this invention shown in FIG. 7 could be modified by eliminating the grommets 197. Some portion of the sidewall of the valve body 144 on both sides of the membrane 188 would be made thicker. One or more holes would be made starting in the inlet cavity 190, through the thicker portion of the sidewall bypassing the membrane 188 and entering the vent cavity 192. This hole or holes should have an effective cross-sectional area determined in the same manner as the clearance 94 shown in FIGS. 3–5 and the area of the holes 144 shown in FIG. 7. FIG. 8 shows one configuration of a valve made in accordance with this invention which has one or more holes 185 through a thickened portion 185' of the sidewall of the valve body to act as the opening.

FIG. 8 also shows another variation of this invention in which the drain port 141 and the vent orifice 173 are not located in the drain valve body 144. Rather, the drain port 141 is located at the end of the pressure adjustment screw 162. The vent orifice 173 comprises the clearance between the valve stem 158 and the surface of the hole in the pressure adjustment screw 162 into which the valve stem extends.

FIG. 8 also shows a spring and assembly 199 which places stabilizing pressure on the piston assembly 178 during the operation of the drain valve. This type of structure is well known to those skilled in the art and merely illustrates one more possible variation of the structure of a drain valve made in according with this invention.

Many other modifications and changes can be made to the drain valve of this invention by those skilled in the art of designing drain valves without departing from its spirit and scope. Thus, the appended claims are intended to be interpreted to cover such equivalent valves as do not depart from the spirit and scope of this invention.

What is claimed is:

1. A drain valve for removing liquid from a compressed air system driven by a compressor pump which operates according to the pressure of the system to cycle between a desired maximum pressure and a desired minimum pressure, said drain valve comprising, in combination:

(a) A drain valve assembly including a drain valve body forming a central cavity, an inlet port located in said drain valve assembly and adapted to be connected to the compressed air system, and a drain port located in said drain valve assembly away from said inlet port;

(b) Said drain valve assembly further including a valve operating structure mounted within said central cavity and a vent passageway located between a first portion of said central cavity and said drain port, said passageway including a vent orifice for controlling the flow of liquid through said vent passageway and said drain port;

(c) A piston assembly, at least a portion of said piston assembly mounted within said first portion of said central cavity between said inlet port and said vent passageway and having an inlet face which can seal said inlet port when said piston is contiguous said inlet port and a vent face having an area larger than said inlet face which can seal said vent passageway when said piston is contiguous said vent passageway;

(d) Said piston assembly including a dividing member which divides said first portion of said central cavity into a vent cavity located between said dividing member and said vent passageway and an inlet cavity located between said dividing member and said inlet port; an opening between said inlet cavity and said vent cavity, said opening having an area larger than the area of said vent orifice, but smaller than the other areas through which fluid can flow between said inlet port and said vent orifice;

(e) An adjustable pressure valve assembly mounted within said valve operating structure, said adjustable pressure valve assembly exerting force on said piston assembly toward said inlet port to seal said inlet port when there is no pressure at said inlet port;

(f) The area of said inlet face of said piston assembly is of a size which, when said inlet face is sealing said inlet port, allows the force exerted by said valve member to be overcome by a preselected high drain pressure at said inlet port as the pressure of the compressor system increases toward the desired maximum pressure, said inlet face moving away from said inlet port at the high drain pressure to allow liquid to drain from said inlet port and through a flow path comprising said inlet cavity, said opening, said vent cavity, said vent passageway including said vent orifice and said drain port, while the relative sizes of the areas of said opening and said vent orifice prevent said vent face on said piston assembly from moving to a closed position against said vent passageway until compressed air begins flowing through said flow path;

(g) The area of said vent face of said piston assembly is of a size such that, when said vent face is sealing said vent passageway, pressure on the piston assembly prevents the force exerted by said valve member from overcoming the pressure of the compressed air system until a preselected low drain pressure is reached at said inlet port as the pressure of the compressor system decreases toward the desired minimum pressure, said vent face being moved away from said vent passageway at said low drain pressure to allow liquid to drain from said inlet port and through said flow path comprising said inlet cavity, said opening, said vent cavity, said vent passageway including said vent orifice, and said drain port, while the relative sizes of the areas of said opening and said vent orifice prevent said inlet face on said piston assembly from moving to a closed position against said inlet port until after compressed air begins flowing through said flow path.

2. A drain valve according to claim 1 in which said dividing member comprises a disk having dimensions which cause a clearance to occur between said disk and side walls of said central cavity, said clearance forming said opening between said central cavity and said vent cavity.

3. A drain valve according to claim 1 in which said dividing member comprises a diaphragm secured at sidewalls of said first portion of said central cavity, at least one hole located within said diaphragm, said at least one hole forming said opening between said inlet cavity and said vent cavity.

4. A drain valve according to claim 1 in which said dividing member comprises a diaphragm secured at sidewalls of said first portion of said central cavity, said opening between said inlet cavity and said vent cavity comprising at least one hole within said sidewalls extending around said diaphragm from said inlet cavity to said vent cavity.

5. A drain valve according to claim 1 in which said vent orifice and said drain port are located in said drain valve body.

6. A drain valve according to claim 1 in which said vent orifice and said drain port are located in said valve operating structure.

7. A drain valve according to claim 1 wherein said adjustable pressure valve assembly comprises a spring exerting force on said piston assembly.

8. A drain valve according to claim 1 wherein said adjustable pressure valve assembly comprises a valve stem and a spring exerting force through said valve stem on said piston assembly.

9. A drain valve according to claim 1 wherein said vent passageway is located at least partially within said valve operating structure mounted within said central cavity.

10. A drain valve for removing liquid from a compressed air system driven by a compressor pump which operates according to the pressure of the system to cycle between a desired maximum pressure and a desired minimum pressure, said drain valve comprising, in combination:

(a) A drain valve assembly including a drain valve body forming a central cavity, an inlet port located in said drain valve assembly and adapted to be connected to the compressed air system, and a drain port located in said drain valve body away from said inlet port;

(b) Said drain valve assembly further including a valve operating structure mounted within said central cavity and a vent passageway located at least partially within said valve operating structure between a first portion of said central cavity and said drain port, said passageway including a vent orifice located in said drain valve body for controlling the flow of liquid through said vent passageway and said drain port;

(c) A piston assembly, at least a portion of said piston assembly mounted within said first portion of said central cavity between said inlet port and said vent passageway and having an inlet face which can seal said inlet port when said piston is contiguous said inlet port and a vent face having an area larger than said inlet face which can seal said vent passageway when said piston is contiguous said vent passageway;

(d) Said piston assembly including a disk which divides said first portion of said central cavity into a vent cavity located between said disk and said vent passageway and an inlet cavity located between said disk and said inlet port; said disk having dimensions which cause a clearance to occur between said disk and sidewalls of said central cavity, said clearance forming an opening between said inlet cavity and said vent cavity, said opening having an area larger than the area of said vent orifice, but smaller than the other areas through which fluid can flow between said inlet port and said vent orifice;

(e) An adjustable pressure valve assembly including a spring mounted around a valve stem and located within said valve operating structure, said spring and valve stem exerting force on said piston assembly toward said inlet port to seal said inlet port when there is no pressure at said inlet port;

(f) The area of said inlet face of said piston assembly is of a size which, when said inlet face is sealing said inlet port, allows the force exerted by said valve member to be overcome by a preselected high drain pressure at said inlet port as the pressure of the compressor system increases toward the desired maximum pressure, said inlet face moving away from said inlet port at the high drain pressure to allow liquid to drain from said inlet port and through a flow path comprising said inlet cavity, said opening, said vent cavity, said vent passageway including said vent orifice and said drain port, while the relative sizes of the areas of said opening and said vent orifice prevent said vent face on said piston assembly from moving to a closed position against said vent passageway until compressed air begins flowing through said flow path;

(g) The area of said vent face of said piston assembly is of a size such that, when said vent face is sealing said vent passageway, pressure on the piston assembly prevents the force exerted by said valve member from overcoming the pressure of the compressed air system until a preselected low drain pressure is reached at said inlet port as the pressure of the compressor system decreases toward the desired minimum pressure, said vent face being moved away from said vent passageway at said low drain pressure to allow liquid to drain from said inlet port and through said flow path comprising said inlet cavity, said opening, said vent cavity, said vent passageway including said vent orifice, and said drain port, while the relative sizes of the areas of said opening and said vent orifice prevent said inlet face on said piston assembly from moving to a closed position against said inlet port until after compressed air begins flowing through said flow path.

* * * * *